(12) United States Patent
Winzer

(10) Patent No.: US 7,133,622 B2
(45) Date of Patent: Nov. 7, 2006

(54) RETURN-TO-ZERO (RZ) OPTICAL DATA MODULATOR

(75) Inventor: Peter J. Winzer, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 670 days.

(21) Appl. No.: 10/134,091

(22) Filed: Apr. 26, 2002

(65) Prior Publication Data

US 2003/0007231 A1    Jan. 9, 2003

Related U.S. Application Data

(60) Provisional application No. 60/302,836, filed on Jul. 3, 2001.

(51) Int. Cl.
*H04B 10/04* (2006.01)
(52) U.S. Cl. ................................. 398/188; 398/185
(58) Field of Classification Search ............... 398/183, 398/185, 188, 189
See application file for complete search history.

(56) References Cited

U.S. PATENT DOCUMENTS

2002/0196508 A1* 12/2002 Wei et al. .................. 359/183

OTHER PUBLICATIONS

Takayama, K., et al., "An All-Optical 10-GHz LD-Based Clock Regenerator Using a Mach-Zehnder Interferometer-Type NRZ-to-RZ Converter," Tech digest of European Conference on Optical Communication ECOC '91, 1991, paper MoC1-2, pp. 77-80.*

U.S. Appl. No. 09/745785, filed Dec. 22, 2000, Leuthold et al.
S. D. Personick, "Receiver Design For Digital Fiber Optical Communication Systems, I", *Bell System Technical Journal*, vol. 52, No. 6, pp. 843-874 (1973).
L. Boivin et al., "Receiver Sensitivity Improvement by Impulsive Coding", *IEEE Photon. Technol. Lett.*, vol. 9, No. 5, pp. 684-686 (1997).
W. A. Atia et al., "Demonstration of Return-to-Zero Signaling in Both OOK and DPSK Formats to Improve Receiver Sensitivity in an Optically Preamplified Receiver", *Proc. IEEE LEOS'99*, TuM3, pp. 226-227.

(Continued)

*Primary Examiner*—Christina Y. Leung
(74) *Attorney, Agent, or Firm*—Barry H. Freedman

(57) ABSTRACT

A method and apparatus for variable duty cycle generation of optical RZ data signals uses a single, NRZ-driven phase modulator followed by a optical delay-line interferometer. If desired, a differential encoder precodes an NRZ data signal before being applied to the data input of a phase modulator arranged to modulate the light emerging from a continuously operating laser. The output of the modulator is then applied to an optical delay interferometer, such that the optical signal is split into first and second optical signals, each of which is applied to a respective one of the two interferometer arms. The interferometer is arranged such that the signal in one of the arms is controllably delayed with respect to the other (a) by a fine delay (on the other of the optical wavelength) to produce destructive interference in the absence of phase modulation by said phase modulator, and (b) by a coarse delay (on the order of a bit period), to produce RZ pulses having the desired duty cycle. The optical signals in each of the arms are then recombined to form the interferometer output, which is the desired optical RZ data signal.

15 Claims, 2 Drawing Sheets

BLOCK DIAGRAM OF RZ SOURCE

OTHER PUBLICATIONS

P. J. Winzer et al., "Sensitivity Enhancement of Optical Receivers By Impulsive Coding", *J. Lightwave Technol.*, vol. 17, No. 2, pp. 171-177 (1999).

D. Breuer et al., "Comparison of NRZ- and RZ-Modulation Format for 40-Gb/s TDM Standard-Fiber Systems", *IEEE Photon. Technol. Lett.*, vol. 9, No. 3, pp. 398-400 (1997).

R. Ludwig et al., "Experimental Comparison of 40 Gbit/s RZ and NRZ Transmission Over Standard Single Mode Fibre", *Electron. Lett.*, vol. 35, No. 25, pp. 2216-2218 (1999).

C. Caspar et al., "RZ Versus NRZ Modulation Format For Dispersion Compensated SMF-Based 10-Gb/s Transmission With More than 100-km Amplifier Spacing", *IEEE Photon, Technol. Lett.*, vol. 11, No. 4, pp. 481-483 (1999).

A. Ougazzaden et al., "40Gb/s Tandem Electro-Absorption Modulator", *Proc. OFC'01*, PD14-1—PD14-3.

R. A. Griffin et al., "Integrated 10Gb/s Chirped Return-to-Zero Transmitter Using GaAs/AlGaAs Modulators", *Proc. OFC'01*, PD15-1—PD15-3 (2001).

H. Suche et al., "Integrated Optical Ti:Er:LiNb0$_3$ Soliton Source", *IEEE J. Quantum Electron.*, vol. 33, No. 10, pp. 1642-1646 (1997).

N.M. Froberg et al., Generation of 12.5Gb/s Soliton Data Stream With an Integrated Laser-Modulator Transmitter, *Electron. Lett.*, vol. 30, No. 22, pp. 1880-1881 (1994).

J.J. Veselka et al., "A Soliton Transmitter Using a CW Laser and an NRZ Driver Mach-Zehnder Modulator", *IEEE Photon, Technol. Lett.*, vol. 8, No. 7, pp. 950-952 (1996).

E. A. Lee et al., *Digital Communication*, $2^{nd}$ *edition*, Kluwer Academic Publishers, (1994), pp. 564-565.

T. Chikama et al., "Modulation and Demodulation Techniques in Optical Heterodyne PSK Transmission Systems", *J. Lightwave Technol.*, vol. 8, pp. 309-322 (1990).

\* cited by examiner

BLOCK DIAGRAM OF RZ SOURCE

RETURN-TO-ZERO (RZ) OPTICAL DATA MODULATOR

CROSS REFERENCE TO RELATED APPLICATION

This application claims priority of Provisional Application Ser. No. 60/302,836 which was filed on Jul. 3, 2001.

FIELD OF INVENTION

This invention relates to the field of optical telecommunications, in particular to a method and apparatus for generating optical return-to-zero (RZ) data signals.

BACKGROUND OF THE INVENTION

Optical RZ signals are becoming increasingly important in optical communication systems. They have proven to be superior to the non-return-to-zero (NRZ) format both in terms of receiver sensitivity, which is discussed in S. D. Personick, "Receiver design for digital fiber optic communication systems I", Bell Syst. Tech. J., vol. 52, 843–874 (1973), L. Boivin et al., "Receiver sensitivity improvement by impulsive coding", IEEE Photon. Technol. Lett. vol. 9, no. 5, 684–686 (1997), W. A. Atia et al., "Demonstration of return-to-zero signaling in both OOK and DPSK formats to improve receiver sensitivity in an optically preamplified receiver", Proc. IEEE LEOS'99, TuM3, and P. J. Winzer et al., "Sensitivity enhancement of optical receivers by impulsive coding", J. Lightwave Technol. vol. 17, no. 2, 171–177 (1999), and in terms of fiber transmission performance, which is discussed in D. Breuer et al., "Comparison of NRZ- and RZ-modulation format for 40-Gb/s TDM standard-fiber systems", IEEE Photon. Technol. Lett., vol. 9, no. 3, 398–400 (1997), R. Ludwig et al., "Experimental comparison of 40 Gbit/s RZ and NRZ transmission over standard single mode fibre", Electron. Lett., vol. 35, no. 25, 2216–2218 (1999), and in C. Caspar et al., "RZ versus NRZ modulation format for dispersion compensated SMF-based 10-Gb/s transmission with more than 100-km amplifier spacing", IEEE Photon. Technol. Lett., vol. 11, no. 4, 481–483 (1999). The two most commonly used techniques to generate optical RZ data streams either employ a sinusoidally driven intensity modulator or an actively mode-locked laser, as described, for example, in A. Ougazzaden et al., "40 Gb/s tandem electro-absorption modulator", Proc. OFC'01, PD14 (2001), R. A. Griffin et. al., "Integrated 10 Gb/s chirped return-to-zero transmitter using GaAs/AlGaAs modulators", Proc. OFC'01, PD15 (2001), and H. Suche et al., "Integrated optical Ti:Er:LiNbO3 soliton source", IEEE J. Quantum Electron., vol. 33, no. 10, 1642–1646 (1997), in addition to a NRZ data modulator. Apart from the need for two or more high-power RF components, these techniques necessitate accurate synchronisation between the data modulator and the pulse source. Two less frequently used techniques make use of electrical RZ generation by means of gating the NRZ clock with the NRZ data signal (see N. M. Froberg et al., "Generation of 12.5 Gbit/s soliton data stream with an integrated laser-modulator transmitter", Electron. Lett., vol. 30, no. 22, 1880–1881 (1994) or drive a Mach-Zehnder intensity modulator with the NRZ data between its transmission minima (see J. J. Veselka et al., "A soliton transmitter using a cw laser and an NRZ driven Mach-Zehnder modulator", IEEE Photon. Technol. Lett., vol. 8, no. 7, 950–952 (1996)).

SUMMARY OF INVENTION

In accordance with the present invention, a method and apparatus for variable duty cycle generation of optical RZ data signals uses a single, NRZ-driven phase modulator followed by an optical delay-line interferometer. The technique eliminates the need for any synchronization between two signals (i.e. between the data bearing NRZ signal and the drive signal to the RZ pulse carver) and considerably alleviates the requirements on the driver amplifiers.

In one embodiment of the present invention, a differential encoder precodes an NRZ data signal before being applied to the data input of a phase modulator (which can be implemented in various arrangements, including within the laser itself) which is arranged to modulate the light emerging from a continuously operating laser source. The output of the modulator is then applied to an optical delay interferometer, such that the optical signal is split into first and second optical signals, each of which is applied to a respective one of the two interferometer arms. The interferometer is arranged such that the signal in one of the arms is delayed with respect to the other with a fixed or controllable coarse delay (which is less than the duration of one bit of said data signal) that generates the desired RZ pulses, and with a controllable fine delay (on the order of the optical wavelength of the light generated by said laser source) that produces destructive interference in the absence of any phase modulation by the phase modulator. Alternatively, the fine delay can be eliminated by appropriately controlling the wavelength of the laser source so as to create destructive interference at the interferometer output in the absence of phase modulation. The optical signals in each of the arms are then recombined to form the interferometer output, which is the desired optical RZ data signal. This RZ data signal advantageously represents the original data, rather than a differentially encoded version of that data. The duty cycle of the RZ data signal is adjusted by varying the relative delay in the interferometer.

In another embodiment, the NRZ data is applied directly to the phase modulator, eliminating the use of a differential encoder in the transmitter. In this latter embodiment, the signal transmitted from the transmitter to the receiver represents a differentially encoded version of the original data, rather than the original data itself. Accordingly, differential post-encoding has to be performed in the receiver to restore the original information carrying data bit sequence.

BRIEF DESCRIPTION OF DRAWINGS

The present invention will be more fully appreciated by consideration of the following detailed description, which should be read in light of the drawing in which.

DETAILED DESCRIPTION OF INVENTION

Figure 1:
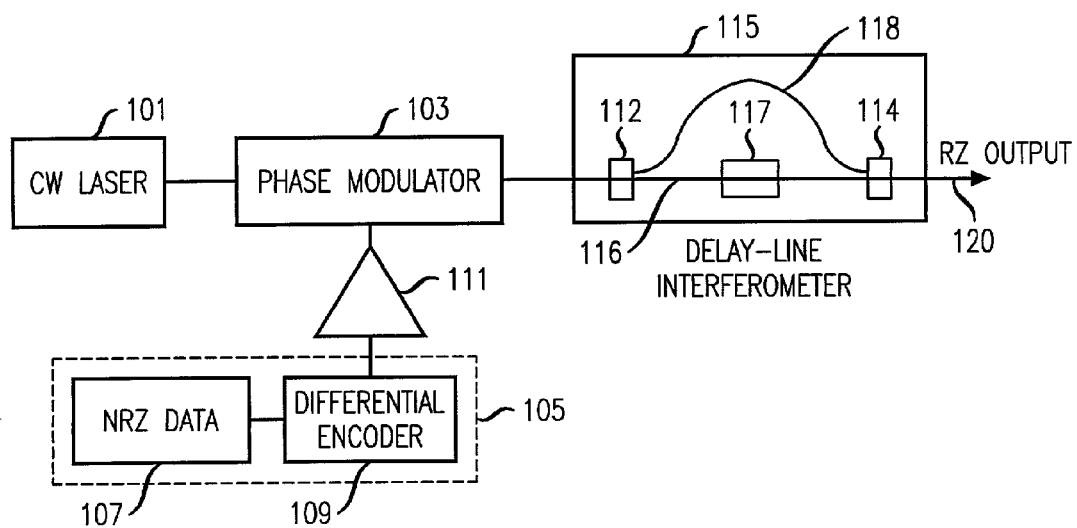
FIG. 1 is a block diagram of one embodiment of a variable duty cycle RZ modulator arranged in accordance with the present invention.
Figure 2A:
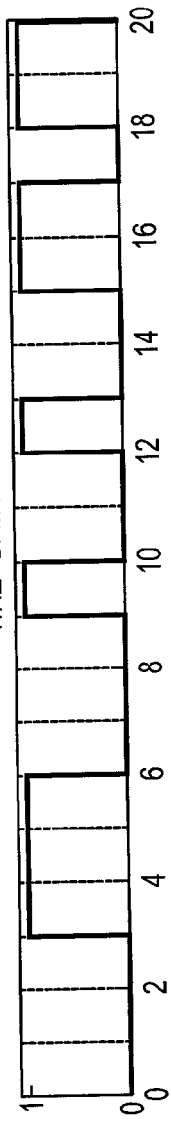
FIG. 2 is a diagram illustrating the waveforms present at various points in the arrangement of FIG. 1.
Figure 2B:
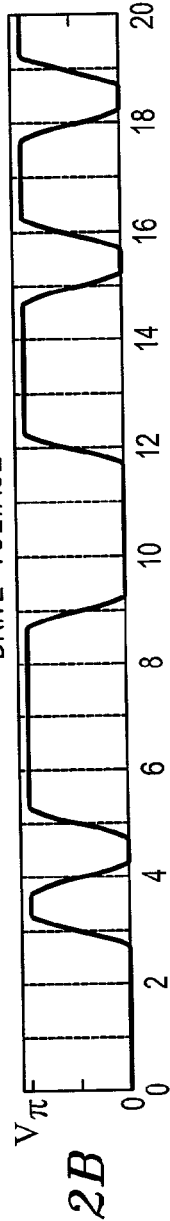
Figure 2C:
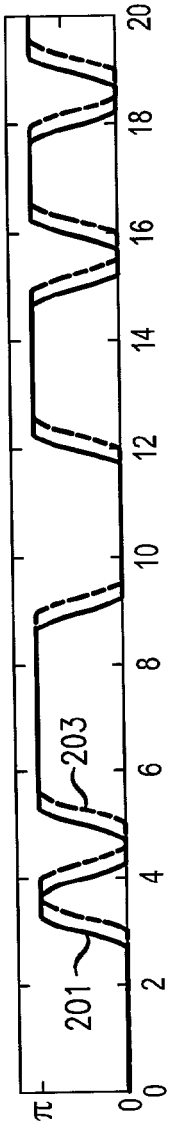
Figure 2D:
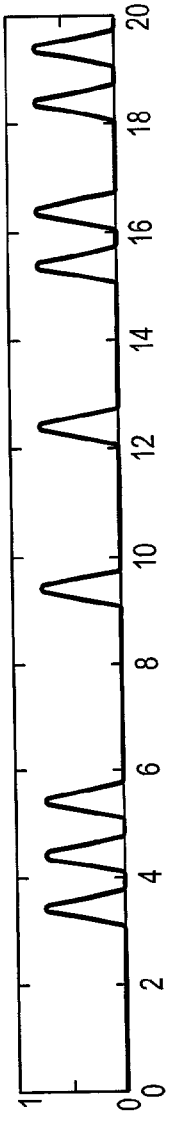

Referring first to FIG. 1, there is shown a block diagram of a modulator arranged in accordance with the present invention to generate a variable duty cycle optical RZ data signal. The light from a continuously operating (CW) laser source 101 is first passed through a phase modulator 103 that is driven in this embodiment by a differentially encoded data signal received from a data source shown generally at 105.

If desired, the encoded data signal can be amplified in an amplifier 111. The output of phase modulator 103 is then applied to an optical delay line interferometer 115, which splits the NRZ modulator output in a first splitter 112 and applies a portion of the NRZ optical signal to each of two interferometer arms 116, 118. One of the interferometer arms 116 includes an adjustable delay element 117 which is arranged to control the amount of delay introduced in the optical signal in each interferometer arm with respect to the other, to (a) provide a "fine delay" that causes destructive interference in the absence of phase modulation, and (b) to offset the signals in one interferometer arm by a "coarse delay" that is less than one bit period, with respect to the signals in the other interferometer arm, so as to provide RZ pulses with the desired duty cycle. By varying the offset, the duty cycle can advantageously be easily adjusted.

The "coarse delay" and the "fine delay" achieved by the delay element 117 can be split among separate delay elements arranged in both interferometer arms 116 and/or 118. Further, the delay element(s) need not be made variable. In this latter case, the "fine delay" can be accomplished by fine-tuning the frequency of the laser source 101, whereas the coarse delay can be provided by using a fixed delay element. The signals in each arm are then recombined in a second splitter 114 (acting as a combiner) in order to provide the optical output 120. Both splitters 112 and 114 can be made tunable to offset manufacturing tolerances, and thus to increase the extinction ratio of the RZ source.

The differentially encoded NRZ data signal output from data source 105 is obtained by applying the output of an NRZ data source 107 to a differential encoder 109, which is arranged to provide an output that exhibits a change in its logic level for each logical '1'-bit to be encoded (and the absence of an change in its logic level for each logical '0' bit to be encoded, or vice versa). Differential encoding can be done entirely in the digital domain using, e.g., a one-bit-delay feedback and an XOR gate as described in E. A. Lee et al., Digital Communication, 2nd edition, Kluwer Academic Publishers (1994). Phase modulation can be realized in modulator 103 in various ways, including a straight-line LiNbO3 or semiconductor phase modulator, a LiNbO3 or semiconductor Mach-Zehnder modulator operated as a phase modulator in push-pull operation, as described in T. Chikama et al., "Modulation and demodulation techniques in optical heterodyne PSK transmission systems", J. Lightwave Technol. 8 309–321 (1990), and a directly phase modulated semiconductor laser, as described in the Shirasaki et al. paper cited above.

Various arrangements for interferometer 115 will be apparent to persons skilled in the art. Specifically, the interferometer may include a single delay element in one interferometer arm, that provides both the coarse and fine delays described above, or two separate delay elements, one in each interferometer arm, that each provide one of the coarse and fine delays described above. If a single element is used, it is advantageous that the delay provided be adjustable or controllable, such as by using an electrical control signal. If two delay elements are used, one may be fixed and the other adjustable. It is also to be noted, as mentioned above, that the destructive interference brought about by the "fine delay" can instead be achieved by simply varying the wavelength of the laser source 101 such that, in the absence of a signal applied to phase modulator 103 from data source 105, a particular arrangement of interferometer 115 produces destructive interference when the signals in its two arms are combined in splitter 114. Reference is made to the teachings contained in co-pending application entitled "3R Optical Signal Regeneration", Ser. No. 09/745785 filed Dec. 22, 2000 on behalf of J. Leuthold et al. and assigned to the same assignee as the present application, which describes a variety of interferometer arrangements. Also note that, depending upon the type of delay element (coarse or fine) required, delay element 117 may be a fiber-optic element or a free-space element, and also can include integrated optics, all of which are well known to persons skilled in the art.

FIG. 2 is a diagram illustrating the waveforms present at various points in the arrangement of FIG. 1. The binary data signal, which is desired to be transmitted in RZ format, is shown in waveform (a). Its differentially encoded version, whose low-pass filtered edges take into account finite-bandwidth driving electronics, is shown in waveform (b). Note that the differentially encoded signal changes from a logical 1 to a logical zero (or vice versa) only when the data is a logical "1". When the data is a logical "0", the value of the differentially encoded signal does not change.

The phases of the two interfering signals in the two arms 116, 118 of interferometer 115, as they appear at the output coupler 114, are shown as solid and dashed lines 201 and 203, respectively, in waveform (c), assuming a straight-line phase modulator 103. If phase modulation was accomplished using a Mach-Zehnder modulator as phase modulator 103 as described above, the phase transitions would occur instantaneously. As indicated in waveform (d), the phase difference between these two signals gives rise to a signal comprising a stream of RZ pulses carrying the original data bit sequence (a).

The achievable extinction ratio is primarily determined by the interferometer's ability to produce destructive interference, which depends on setting the splitting ratios equal, and on tuning the delay element 117 for destructive interference (or, equivalently, on tuning the frequency of laser 101 for destructive interference), but not on dynamic features, such as achieving an exact amount of drive voltage swing (which is a critical issue in a similar technique described in the Veselka article cited above).

An alternative embodiment of the present invention can be arranged to eliminate differential encoder 109 from the arrangement of FIG. 1. In that event, the optical data generated by the transmitter (i.e., the output of interferometer 115 on output 120) represents a differentially encoded version of the original data, rather than the original data (waveform (a) in FIG. 2) itself. This means that if a transmission channel or receiver error occurs, it will tend to propagate or continue, leading to higher overall error ratios, so that this arrangement is therefore generally not preferred.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. Apparatus for generating an optical intensity modulated return-to-zero (RZ) signal, comprising
    an NRZ-driven phase modulator arranged to modulate the phase of a CW laser in accordance with a data signal, and
    an interferometer including an optical delay line for combining a delayed version of the output of said phase modulator with a non-delayed version of said output, said optical delay line imparting a first delay having a duration less than a duration associated with one bit of said data signal; said optical delay line selectively imparting a second delay having a duration associated with an optical wavelength that produces destructive interference in the absence of phase modulation.

2. The apparatus of claim 1 wherein the wavelength of said laser is adjusted to produce destructive interference in the output of said interferometer.

3. The apparatus of claim 1 further including means for controlling the duty cycle of said RZ signal by varying the delay provided by said optical delay line.

4. The apparatus of claim 1 wherein said phase modulator is a straight-line phase modulator or a Mach-Zehnder phase modulator.

5. The apparatus of claim 1 wherein said phase modulator is arranged for direct phase modulation of semiconductor lasers by drive current modulation.

6. The apparatus of claim 1 wherein said delay line includes a fiber-optic element.

7. The apparatus of claim 1 wherein said delay line includes a free-space element.

8. The apparatus of claim 1 wherein said delay line includes integrated optics.

9. The apparatus of claim 1 wherein the RZ duty cycle is varied by changing the delay of the interferometer.

10. The apparatus of claim 1 wherein the data signal is differentially encoded.

11. The apparatus of claim 1, wherein said first delay comprises one of a predetermined delay and a controllable delay.

12. The apparatus of claim 1, wherein said first and second delays comprise, respectively, selective coarse and fine delays.

13. Apparatus for generating an optical intensity modulated return-to-zero signal, comprising
  a phase modulator arranged to modulate the phase of a CW laser in accordance with a non-return to zero (NRZ) data signal having a specified bit period, and
  an interferometer having first and second arms each receiving a portion of the output of said modulator and arranged to (a) provide destructive interference in the absence of phase modulation, and (b) delay the signal in one of said arms by an amount less than said specified bit period, as compared to the signal in the other of said arms, wherein the delayed signal is delayed by a fine delay sufficient to cause destructive interference, and a coarse delay that is less than said specific bit period of said data signal.

14. Apparatus for generating an optical intensity modulated return-to-zero (RZ) signal, comprising
  a phase modulator arranged to generate a modulated optical signal by modulating the phase of a CW laser in accordance with a differentially encoded non-return-to-zero (NRZ) data signal,
  means for splitting said modulated optical signal into first and second optical signals, and
  means for recombining said first optical signal with a delayed version of said second optical signal, wherein said delayed version is delayed by (a) a fine delay sufficient to cause destructive interference in said recombined signal, and (b) a coarse delay tat is less than one bit period of said data signal.

15. A method for generating an optical intensity modulated return-to-zero (RZ) signal, comprising the steps of
  generating a modulated optical signal by modulating the phase of a CW laser in accordance with a differentially encoded non-return-to-zero (NRZ) data signal,
  splitting said modulated optical signal into first and second optical signals, and
  recombining said first optical signal with a delayed version of said second optical signal, wherein said delayed version is delayed by (a) a time delay sufficient to cause destructive interference in said recombined signal, and (b) a coarse delay that is less than one bit period of said data signal.

* * * * *